Figure 1:
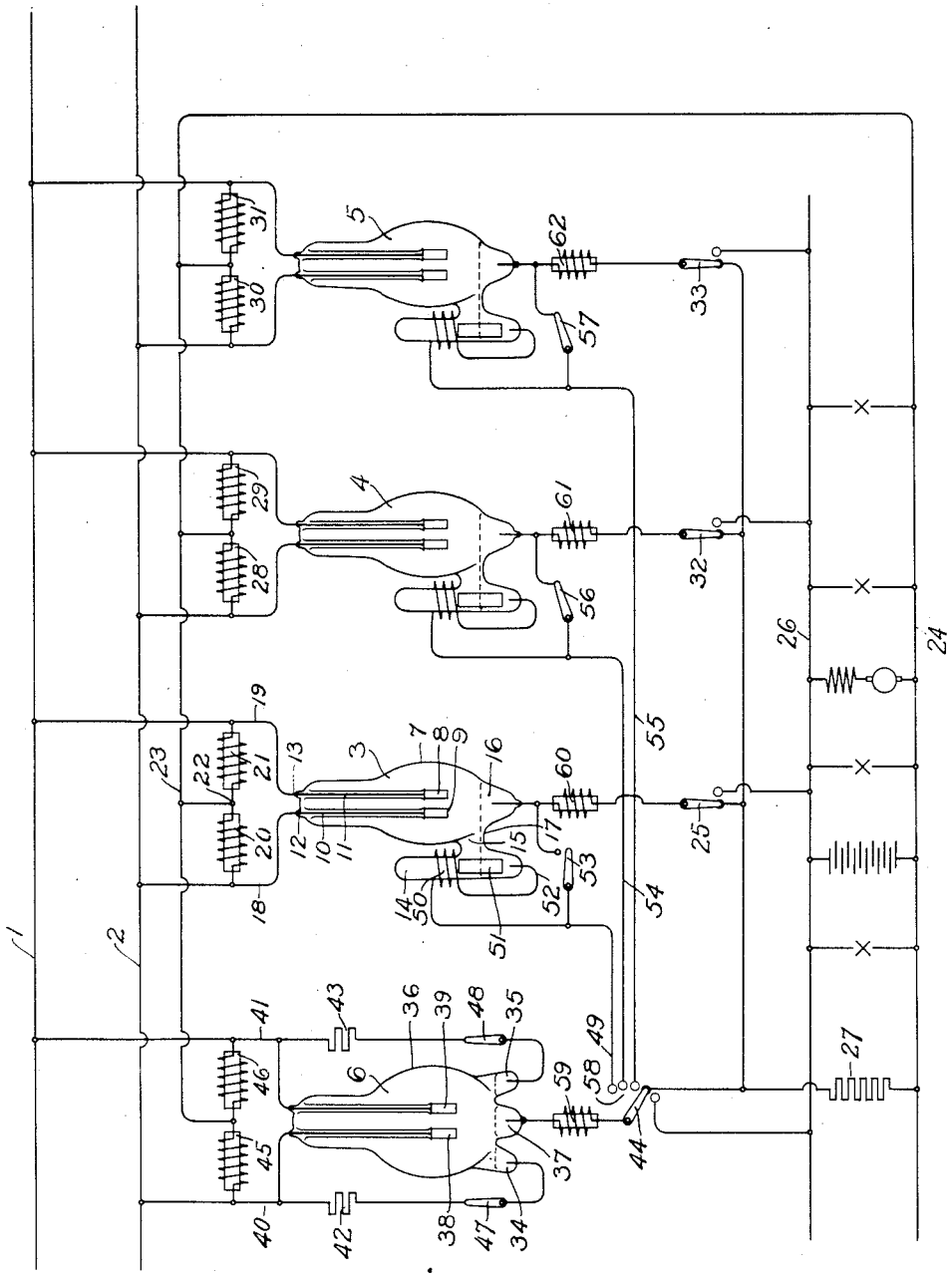

No. 868,380. PATENTED OCT. 15, 1907.
E. WEINTRAUB.
SYSTEM OF ELECTRICAL DISTRIBUTION.
APPLICATION FILED JULY 23, 1903. RENEWED JULY 9, 1907.

2 SHEETS—SHEET 1.

Witnesses:
George A. Thornton,
Helen Orford

Inventor:
Ezechiel Weintraub,
by Albert G. Davis
Atty.

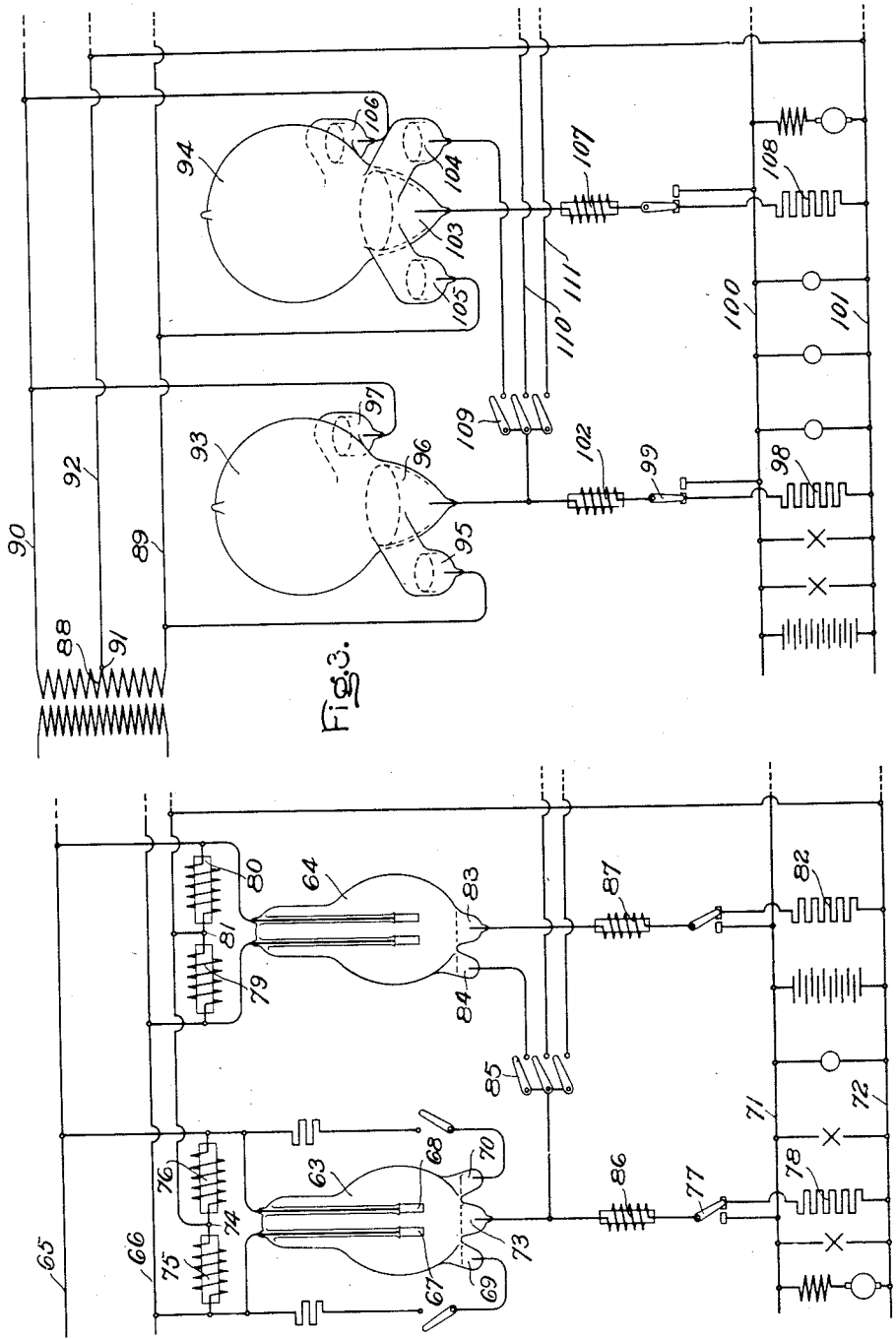

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 868,380.     Specification of Letters Patent.     Patented Oct. 15, 1907.

Application filed July 23, 1903, Serial No. 166,657. Renewed July 9, 1907. Serial No. 382,931.

*To all whom it may concern:*

Be it known that I, EZECHIEL WEINTRAUB, a subject of the Czar of Russia, residing at Schenectady, county of Schenectady, State of New York, have invented certain new and useful Improvements in Systems of Electrical Distribution, of which the following is a specification.

My present invention relates more especially to an organization embodying vapor electric conductors such for example as rectifiers for converting alternating current into direct current. It is to be understood, however, in what follows, that my invention is not limited in its application to vapor rectifiers but is useful in other relations as well, as for example in connection with vapor electric lamps or the like.

One of the features of my invention comprises means whereby any number of vapor electric lamps or rectifiers may be conveniently started. To this end I provide a source of starting current, which may be a separate rectifier, and this source I connect so that current therefrom may be passed through any one of the rectifiers or lamps which is to be started in a manner such as to produce in the lamp or rectifier a starting arc springing from that electrode of the lamp or rectifier which it is desired should be a cathode, and having a direction of current flow such as to make said electrode a cathode with respect to the starting arc. This electrode being thus positively excited, as it were, gives off ionized vapor which makes the interior of the envelop containing the electrode conducting and causes the rectifier or the lamp, as the case may be, to start.

Various novel features are characteristic of my invention, and these features I have endeavored to point out with particularity in the appended claims. The invention itself, however, both as to its practical construction and application, and its mode of operation, will be better understood by reference to the following description taken in connection with the accompanying drawing in which Figure 1 represents a distribution system embodying a plurality of vapor rectifiers arranged to be started in accordance with my invention, while Figs. 2 and 3 represent modified applications of my invention.

In Fig. 1 a source of alternating current is represented conventionally by alternating current mains 1 and 2. A plurality of vapor rectifiers are represented as connected across these mains and as supplying current to a common load. These rectifiers are indicated respectively at 3, 4 and 5 while a fourth is indicated at 6. The last-mentioned rectifier may be utilized as the source of starting current for the other rectifiers and when these rectifiers are started may, if desired, be connected so as to help supply the common load. The rectifiers 3, 4 and 5 are of substantially the same construction so that a description of one will suffice for all.

The rectifier 3, the form and construction of which may be widely varied, consists, in the present instance, of an exhausted envelop 7 of an approximate pear-shape having in the lower portion thereof, in a pocket, a body of mercury or other suitable vaporizable material which serves as one of the main electrodes, in this case the cathode of the rectifier. Above the cathode two electrodes 8, 9 are supported in place by depending glass-covered iron rods or wires 10 and 11 connected to platinum leading-in wires 12 and 13 passing through the upper wall of the envelop. These electrodes 8 and 9 may for example be formed of titanium carbid, which I find gives exceedingly good results as an electrode material, or if desired may be formed of nickel.

At one side, the envelop 3 opens into a tube 14 extending parallel to the axis of the rectifier to a considerable distance above the opening 15 and a short distance below as indicated. A more or less completely exhausted glass tube containing a bundle of iron wires is located axially in this tube and is of such diameter as nearly to fill the tube from side to side but to move freely up and down therein. This exhausted tube, which for convenience I will term an armature, floats in the body of mercury 16 which, as indicated, is in sufficient volume to extend over and fill the lower end of the tube 14 and also to cover the upper portion of the wall or bridge 17 between the two depending pockets of the rectifier. In order to increase the displacement of the armature the open spaces in the bundle may, before the tube is sealed, be filled with mercury or other heavy material such as lead.

In connecting the rectifier for service, the two electrodes 8 and 9 are connected across the supply mains 1 and 2 by leads indicated at 18 and 19. Two inductance coils 20 and 21 are connected in series across these leads and with the junction 22 between them joined to a lead 23 extending to one main 24 of the direct current consumption circuit. The remaining electrode or cathode 16 is arranged so that by a switch 25 it may be connected to the other main 26 of the consumption circuit or to a starting resistance 27, the other terminal of which is connected to the mains 24. The other rectifiers 4 and 5 are, as before mentioned, of the same construction as the rectifier 3 and, like the rectifier 3, are connected across the supply mains 1 and 2 and are each provided with its own set of inductance coils indicated in the case of the rectifier 4 at 28 and 29 and in the case of the rectifier 5 at 30 and 31. The junction between the inductance coils of each set is connected to the lead 23. The cathode of each rectifier is connected by a lead to a switch whereby it can be put into communication either with the main 26 of the consumption circuit or with the starting resistance 27. These switches are indicated at 32 and 33.

In order to start the rectifiers 3, 4 and 5 I provide a separate source of current which, if desired, may be a storage battery or the like though I prefer to employ for the purpose a separate rectifier as indicated at 6. This rectifier is of substantially the same form as the rectifiers previously described, except, however, that it is provided with self-contained means for starting consisting in the present instance of two mercury starting electrodes 34 and 35 contained in pockets forming a part of the exhausted receptacle 36 and located at either side of the main cathode 37. The two solid electrodes 38 and 39 are connected by suitable supporting wires and leading-in conductors to leads 40 and 41 extending from the supply mains 1, 2. These leads are also connected to the starting electrodes 34 and 35, and in these connections to the starting electrodes, for the purpose of limiting the current flow, I respectively insert resistances or inductances 42 and 43.

In order to start the rectifier 6 the envelop is tipped or shaken so as to cause the mercury of the starting electrodes to flow over into contact with the cathode 37 and then separate. Current then flows from one or the other of the mains 1, 2 through one of the starting electrodes to the cathode 37 and thence through a switch 44 connecting with the starting resistance 27 and then passing through the main 24, the lead 23, through the junction between the two inductance coils 45 and 46 and back to the other of the mains 1 and 2. The starting arc thus produced in the rectifier renders the interior of the envelop conducting and causes the main arcs to start between the cathode 37 and the main anodes 38 and 39. If desired, the circuits of the starting electrodes may be opened by means of switches 47 and 48. When the rectifier is in operation the inductance coils store and restore energy so as to cause a continuous flow of current in the rectifier and a resulting rectified current nearly constant in value. The mode of operation of the rectifier does not for the present purpose require special amplification since the same has been described in detail in applications heretofore filed by me.

In order to start the rectifiers 3, 4 and 5 from the starting rectifier 6, I may make use of a system of connections indicated clearly in the drawings whereby starting current may be caused to flow in the rectifier to be started in such a manner as to cause an arc to spring from the main vaporizable or mercury electrode such as to make that electrode a cathode. Thus in the case of the rectifier 3, if the switch 44 of the rectifier 6 be thrown so as to connect with the lead 49, current will flow through the solenoid 50 located around the tube 14 so as to act upon the armature 51, heretofore mentioned, and after passing through the solenoid, then through a leading-in conductor 52 communicating with the body of mercury in the lower portion of the tube 14. It will thus be seen that there is furnished a path for current from the direct current circuit of the rectifier 6 through the rectifier 3 to the cathode 16 and thence by way of the switch 25 to the starting resistance 27 and back to the junction between the inductance coils 45 and 46 of the rectifier 6. As soon as current flows, the solenoid 50 draws up its armature 51 thus lowering the level of the mercury in the rectifier and thus causing the mercury to separate across the bridge 17. The current in the starting circuit of which the mercury is a part causes an arc to spring between the two separated bodies of mercury. The direction of current in this arc is such that the electrode 16 is made a cathode. This electrode, being thus excited, gives off mercury ions which migrate or are propagated toward the main anodes 8 and 9 and thereby cause arcs to spring from the anodes to the cathode and so set the rectifier into operation. Current then flows from the supply leads 18 and 19 through the rectifier and by manipulating the switch 25 may be caused to pass through the load between the mains 24 and 26 of the consumption circuit.

The rectifier having once been started, there is no further need for the starting arc. This arc may then be discontinued, along with the flow of current through the solenoid 50, by closing the short-circuiting switch 53, though if desired the same results may be accomplished by moving the switch 44 of the rectifier 6 back either to the starting resistance 27 or to an open circuit position if desired.

The rectifiers 4 and 5 are provided with starting solenoids, armatures, short-circuiting switches and the like, the same as in the case of the rectifier 3, and each may therefore be started in the manner described by throwing the switch 44 to the corresponding contacts connected to the leads 54 and 55 which extend to the rectifiers 4, 5 as shown.

The short-circuiting switches 53, 56 and 57 are not absolutely essential but serve the useful purpose of preventing energization of the solenoids of the respective rectifiers to which they relate as the switch 44 of the rectifier 6 is swung backward or forward over the set of contacts 58. These contacts are close enough together so that the circuit of the rectifier 6 is not broken as the switch 44 is moved backward or forward. As this switch moves over each of the contacts, current passes through the corresponding leads 49, 54 and 55 and if the corresponding short-circuiting switches 53, 56 and 57 are not closed, causes the respective solenoids of the rectifiers to be energized. This action may not be desired as for example in case the rectifier has already been started or in case it is not desired that the particular rectifier or rectifiers connected to one or more of the contacts 58 should be started. Thus the switch 44 may be thrown from the position shown up to the contact connected with the lead 49, without energizing the solenoids of the rectifiers 4 and 5. When it is desired to energize one of the last-mentioned solenoids the corresponding short-circuiting switch 56 or 57, as the case may be, may be opened thereby putting the rectifier in condition for starting.

In order that the rectifiers may be run together in multiple and not interfere with each other in supplying a common load, inductance coils 59, 60, 61 and 62 are connected respectively in circuit with the direct current leads which extend from the rectifiers to the main, such as the main 26, supplying the common load. These inductance coils oppose sudden fluctuations of current and by so doing prevent a sudden increase of current in one rectifier, with the consequent decrease of resistance of the vapor conductor, from acting perhaps in the nature of a short circuit to the other vapor conductor, and thus causing the latter to cease operation.

Fig. 2 shows a somewhat different arrangement for effecting the starting of one rectifier by another. In this figure the rectifiers are each of a construction similar to the rectifier 6 in Fig. 1. The rectifier used for starting purposes, and also for subsequent operation in multiple with the rectifiers which are started thereby, is indicated at 63. At 64 I have represented a rectifier arranged to be started by the rectifier 63 but it is to be understood that though I have indicated but one rectifier in this relation, any number may be arranged so as to be started by the same starting rectifier.

Referring now more in detail to Fig. 2, the alternating-current supply circuit is indicated by mains 65 and 66. The rectifier 63 is connected with its main anodes 67 and 68 across these mains and with its starting anodes 69 and 70 also across these mains. The consumption circuit, consisting of mains 71 and 72 between which translating devices of any desired character are connected, has one of its mains arranged to be connected to the cathode 73 of the rectifier and the other main with the junction 74 between the two inductance coils 75 and 76 connected in series across the supply mains 65 and 66.

When the rectifier 63 is to be started the switch 77 is thrown so as to substitute a starting resistance 78 for the consumption circuit. When the rectifier has been started in the manner already described in connection with Fig. 1, the switch 77 is thrown so as to connect the rectifier to the load. For the purpose of starting other rectifiers, however, it is desirable that when used for this purpose the rectifier should be connected in circuit with the resistance 78 so that it may not carry too much current at a time when additional current therefrom is desired.

The rectifier 64 is connected to the supply mains 65 and 66 like the rectifier 63 and, in the same manner, is provided with inductance coils 79, 80. In starting the rectifier the direct current circuit is connected to the junction 81 between these inductance coils and so as to include either the resistance 78 or the separate starting resistance 82 in circuit with this main electrode or cathode 83. The starting electrode or anode 84 is arranged so that, by a switch 85, it may be connected to the circuit of the cathode 73 of the rectifier 63. By closing this switch and then shaking the rectifier 64 a momentary flow of mercury between the electrodes 83 and 84 causes the establishment of a current which, as the bodies of mercury separate, springs an arc in which the direction of current flow is such that the electrode 83 becomes instantly a cathode thereby causing an immediate starting of the rectifier. The rectifier 63 in starting may require several trials before the starting arcs occur during the proper polarity waves of the alternating current to make the electrode 73 a cathode. This trouble is not present in the starting of the rectifier 64 since the electrode 83 is, as it were, forced to be a cathode immediately upon the springing of the starting arc.

The rectifiers 63 and 64 are provided with steadying devices consisting of inductance coils 86 and 87, or resistances if desired, located respectively in the leads extending from the cathodes 73 and 83 which steadying devices operate, when the rectifiers are thrown across the common load 71 and 72, to enable the rectifiers to operate together in multiple. If, however, the rectifiers operate on separate circuits then of course these steadying devices are not required.

In Fig. 3 I have represented my invention as applied to rectifiers of a somewhat different type than those shown in the preceding figures of the drawing. In this instance the alternating current supply system is arranged so that a neutral conductor may extend therefrom. For this purpose a winding 88, which may be the secondary winding of a transformer, has its outside terminals connected to the alternating current mains 89 and 90 and an intermediate or middle point 91 connected to a neutral conductor 92. The rectifiers fed from this distribution system are indicated at 93 and 94. The rectifier 93 consists of a somewhat globular exhausted glass receptacle having at its lower portion depending pockets filled with bodies of mercury 95, 96 and 97 constituting electrodes. Electrical connections with these electrodes are afforded by suitable leading-in wires. Connections with these electrodes are made so that the two outside electrodes 95 and 97 are connected directly across the supply mains 89 and 90 while the middle electrode or cathode 96 is connected, through the load, to the neutral conductor 92.

In starting, it is preferable that connection from the cathode should be made through a starting resistance 98 to the neutral conductor 92, after which, by means of the switch 99, the load, comprised between the mains 100 and 101, may be substituted. In starting the rectifier 93 the receptacle is tipped so that mercury flows between the cathode 96 and one of the anodes and then flows back so as to draw an arc due to current flowing in the circuit thus formed. If this arc is formed at an instant in the alternating current wave such that current flows toward the electrode 96, this electrode then forms the negative terminal of the circuit and becomes a cathode thus generating ionized vapor and causing the interior of the rectifier to be conducting so that when the other anode becomes of proper polarity the arc is transferred thereto. This action, however, is only possible in the present form of rectifier by reason of the presence of the inductance coil 102 in circuit with the cathode which inductance coil has the effect of causing a lag of current behind its electromotive force such that when the electromotive force of one wave reaches its zero point, the current due thereto is still of considerable value and is in existence when the electromotive force due to the other wave commences to rise. This latter wave, due to the presence of the arc formed by its predecessor, is therefore enabled to start an arc from that anode not utilized by its predecessors. Arcs thus follow alternately from the two anodes 95 and 97 to the cathode 96 and this action continues indefinitely.

In order to start the rectifier 94 without the uncertainty attending the starting present in the case of the rectifier 93 I cause current from the rectifier 93, after the latter has been once started, to pass through the rectifier 94 in such a direction as to produce an arc with the main electrode 103 as the cathode. For this purpose I find it convenient to use a supplemental or additional electrode 104. The other electrodes 105 and 106 are connected as before to the supply mains 89 and 90 and with the main electrode 103 through the current-lagging inductance 107 and the starting resistance 108 to the neutral conductor 92.

In order to start, the electrode 104 is connected by the switch 109 to the lead extending from the cathode of the rectifier 93. The rectifier 94 is then tipped so that mercury flows from the cathode 103 and connects with the starting electrode 104. Upon returning the rectifier 94 to its original position the mercury separates between the electrodes 103 and 104 and the current flow in the circuit completed by the mercury then starts an arc and by thus exciting, as it were, the electrode 103, sets the rectifier 94 into operation. The switch 109 may then be opened and the operation of the starting arc discontinued.

After the rectifiers have been started they may be switched from the starting resistances 98 and 108 to the load on the consumption circuit 100 and 101. In case additional rectifiers are to be started, leads 110, 111, etc., may be connected by corresponding switches, at one end to the direct current circuit of the rectifier 93, and at the other end to the rectifiers to be started. I have considered it unnecessary to illustrate these additional rectifiers since the connections thereto may be made the same as the connections with the rectifier 94.

From the foregoing description it will be evident that various modifications and adaptations of my invention may be made without departing from the spirit of my invention, for which reason I do not wish to be limited to the exact details shown and described.

I do not, in this application, lay claim broadly to the rectifier herein shown, nor to any other feature not specifically claimed herein.

What I claim as new and desire to secure by Letters Patent of the United States, is,

1. The combination of a plurality of vapor rectifiers, and means for causing current from one of the rectifiers to produce a starting arc in one or more of the other rectifiers.

2. The combination of a plurality of vapor rectifiers, means for causing current from one of the rectifiers to pass through a body of mercury in another of said rectifiers, and electromagnetic means operated by said current for separating said body of mercury and thus springing an arc.

3. The combination with a source of alternating current, of a vapor rectifier connected thereto, and a starting rectifier for supplying starting current for the first-mentioned rectifier.

4. The combination of a vapor rectifier having a plurality of electrodes, a plurality of which during normal operation are positive and one of which is negative, and an additional rectifier connected to said negative electrode so as to cause a starting arc to spring therefrom.

5. The combination of a plurality of vapor conductors, a source of alternating current for supplying said vapor conductors, a source of uni-directional starting current, and means for connecting the source of starting current to any one of said vapor conductors.

6. The combination of a vapor conductor, a source of alternating current supply, means for producing a direct current starting arc for said vapor conductor, and means for short-circuiting said arc.

In witness whereof, I have hereunto set my hand this 18th day of July, 1903.

EZECHIEL WEINTRAUB.

Witnesses:
BENJAMIN B. HULL,
MARGARET E. WOOLLEY.